United States Patent
Tsai et al.

(10) Patent No.: US 10,135,306 B2
(45) Date of Patent: Nov. 20, 2018

(54) RELUCTANCE MOTOR AND FLUX BARRIER STRUCTURE THEREOF

(71) Applicant: NATIONAL CHENG KUNG UNIVERSITY, Tainan (TW)

(72) Inventors: Mi-Ching Tsai, Tainan (TW); Po-Wei Huang, Tainan (TW)

(73) Assignee: National Cheng Kung University, Tainan (TW)

(*) Notice: Subject to any disclaimer, the term of this patent is extended or adjusted under 35 U.S.C. 154(b) by 288 days.

(21) Appl. No.: 15/210,100

(22) Filed: Jul. 14, 2016

(65) Prior Publication Data
US 2018/0019626 A1   Jan. 18, 2018

(51) Int. Cl.
*H02K 1/06* (2006.01)
*H02K 19/02* (2006.01)

(52) U.S. Cl.
CPC ............... *H02K 1/06* (2013.01); *H02K 19/02* (2013.01)

(58) Field of Classification Search
CPC .................................. H02K 1/06; H02K 19/02
See application file for complete search history.

(56) References Cited

U.S. PATENT DOCUMENTS

| | | | |
|---|---|---|---|
| 2002/0109429 A1 | 8/2002 | Hattori et al. | |
| 2010/0194228 A1* | 8/2010 | Lee | H02K 29/03 310/156.53 |
| 2012/0074801 A1 | 3/2012 | Brown et al. | |
| 2015/0130317 A1 | 5/2015 | Hung et al. | |
| 2015/0162788 A1 | 6/2015 | Tsai et al. | |

FOREIGN PATENT DOCUMENTS

| | | |
|---|---|---|
| CN | 101764491 A | 6/2010 |
| CN | 204906031 U | 12/2015 |
| TW | 201325029 A | 6/2013 |
| TW | 201519557 A | 5/2015 |
| TW | 201524086 A | 6/2015 |

* cited by examiner

*Primary Examiner* — Naishadh Desai
(74) *Attorney, Agent, or Firm* — Muncy, Geissler, Olds & Lowe, P.C.

(57) ABSTRACT

A reluctance motor and a flux barrier structure thereof are provided. The flux barrier structure is disposed in a rotor, and the flux barrier structure has at least one flux barrier space and a plurality of support bars. The flux barrier space is formed by at least one surrounding wall of the rotor. The support bars are intersected with each other in the flux barrier space, and the support bars are extended from one side of the enclosure wall to the opposite side thereof.

10 Claims, 5 Drawing Sheets

RELUCTANCE MOTOR AND FLUX BARRIER STRUCTURE THEREOF

FIELD OF THE INVENTION

The present invention relates to a reluctance motor and a flux barrier structure thereof, and more particularly to a reluctance motor and a flux barrier structure thereof often used in synchronous reluctance motors.

BACKGROUND OF THE INVENTION

The synchronous motor of the prior art comprises a rotor with a permanent magnet synchronous Motor (PMSM), a rotor with a field coil synchronous motor (FCSM), and a rotor with a reluctance motor (RM) of a salient pole.

A synchronous reluctance motor is a kind of synchronous motor, which is low price, high efficiency, and high responsiveness. The synchronous reluctance motor is provided with a stator and a rotor, and formed by stacking steel sheets. The stator is similar to a stator of the induction motor, and the rotor has a core and a plurality of flux barrier gates generating reluctance difference.

However, the number of the flux barrier gates is less, and the space of the flux barrier gates is small according a structure of the rotor of the synchronous reluctance motor, which results in a reduced reluctance of the flux barrier gates, and decreased torque of the rotor. If the number or the space of the flux barrier gates is increased, a structural strength of the rotor would be reduced, and the rotor would be deformed when the rotor is rotated at a high speed.

As a result, it is necessary to provide a reluctance motor and a flux barrier structure thereof to solve the problems existing in the conventional technologies, as described above.

SUMMARY OF THE INVENTION

An object of the present invention is to provide a flux barrier structure, wherein supporting bars disposed within each of the flux barrier spaces can improve and strengthen a support structure of the rotor.

Another object of the present invention is to provide a reluctance motor, wherein supporting bars disposed within each of the flux barrier spaces can avoid from deforming when the rotor is rotated at a high speed.

To achieve the above objects, the present invention provides a flux barrier structure disposed in a rotor, and the flux barrier structure comprises at least one flux barrier space and a plurality of supporting bars, wherein the flux barrier space is defined by at least one flux barrier surrounding wall. The supporting bars are intersected with each other within the flux barrier space, and extended from one side of the flux barrier surrounding wall to an opposite side of the flux barrier surrounding wall.

In one embodiment of the present invention, the flux barrier space axially passes through the rotor from a top surface of the rotor to a bottom surface thereof.

In one embodiment of the present invention, the supporting bars are arranged to be a meshy construction or a honeycomb construction.

In one embodiment of the present invention, each of the supporting bars has a plurality of extensions, and the extensions are extended in an identical direction or in different directions.

In one embodiment of the present invention, a cross-sectional width of each of the supporting bars is ranged from 1 mm to 2 mm.

In one embodiment of the present invention, a spacing distance between each two of the supporting bars adjacent to each other is ranged from 1 mm to 1.5 mm.

In one embodiment of the present invention, the flux barrier structure comprises a plurality of the flux barrier spaces which are equidistantly disposed and spaced from each other within the rotor.

To achieve the above object, the present invention provides a reluctance motor. The reluctance motor has a stator, a rotor, and a flux barrier structure disposed in the rotor. The flux barrier structure comprises at least one flux barrier space and a plurality of supporting bars, wherein the flux barrier space is defined by at least one flux barrier surrounding wall. The supporting bars are intersected with each other within the flux barrier space, and extended from a side of the flux barrier surrounding wall to an opposite side of the flux barrier surrounding wall.

In one embodiment of the present invention, the reluctance motor further comprises a winding layer disposed on an outer peripheral surface, wherein the winding layer includes a plurality of through holes and a plurality of conductor strips inserted in the through holes respectively.

In one embodiment of the present invention, the reluctance motor further comprises an annular stepped groove formed on an end surface of the surrounding layer, and the annular stepped groove is communicated with the through holes.

As described above, the supporting bars disposed within each of the flux barrier spaces can avoid from reducing a torque of the rotor while increasing the number and the space of the flux barrier spaces. In addition, improving a structural strength of the rotor can avoid from deforming when the rotor is rotated at a high speed.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

Figure 1:
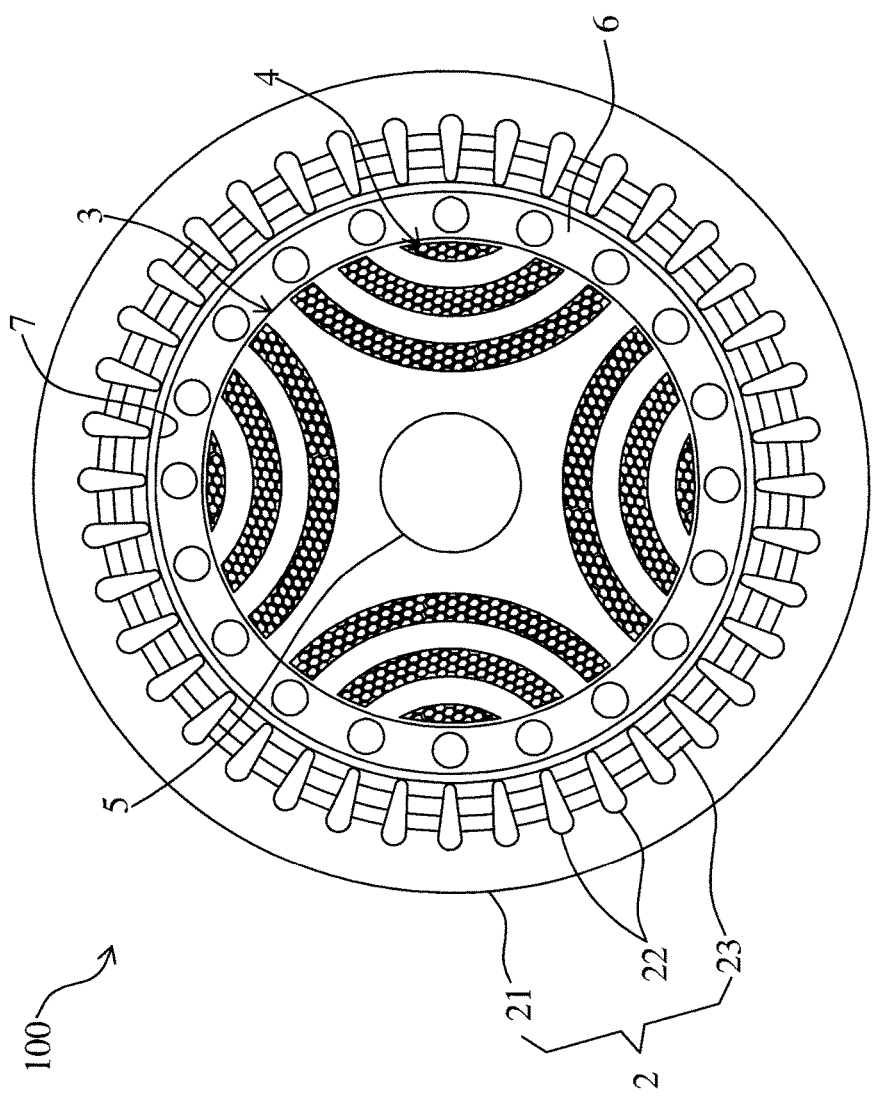
FIG. 1 is a view of a reluctance motor according to a preferred embodiment of the present invention.
Figure 2:
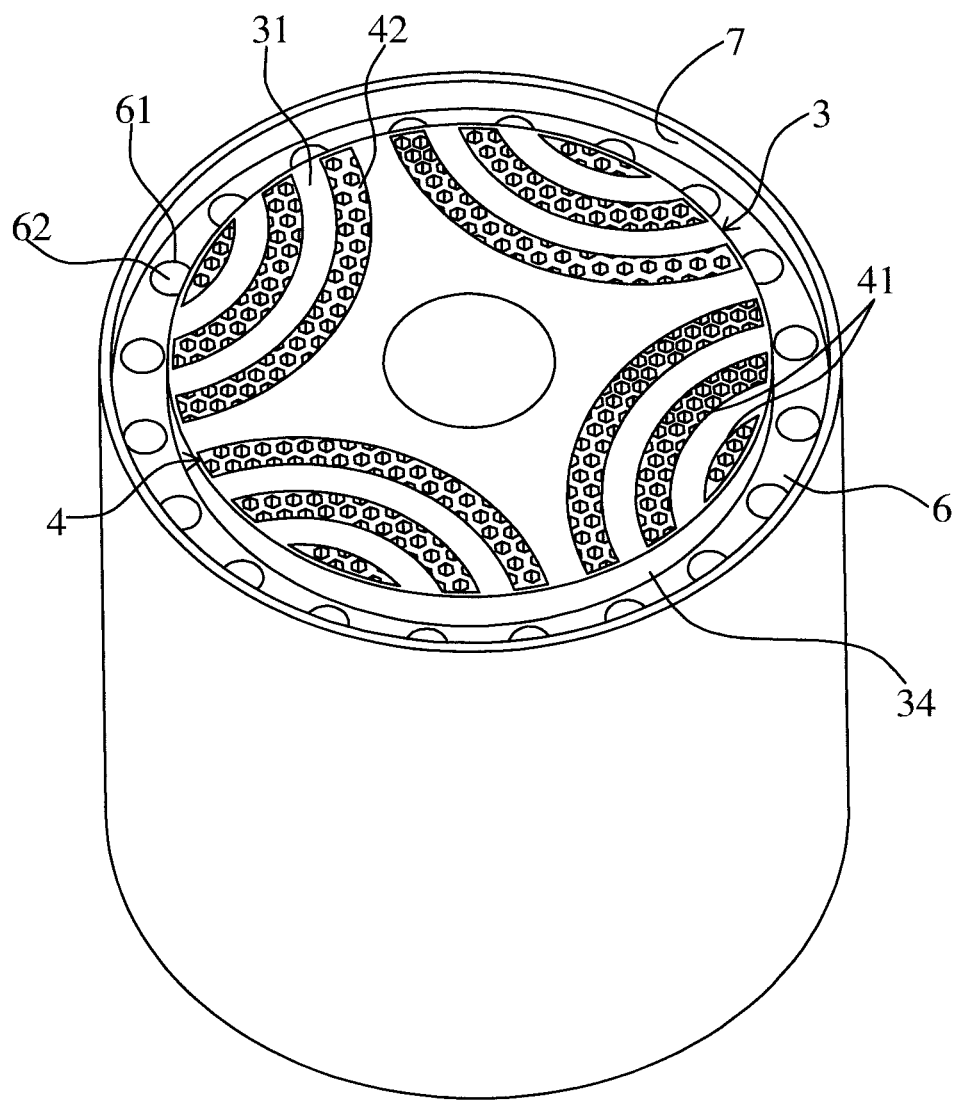
FIG. 2 is a schematic view of a rotor of the reluctance motor according to a preferred embodiment of the present invention.

Refer to FIGS. 1 and 2, which are a reluctance motor according to a preferred embodiment of the present invention used in the synchronous reluctance motors, wherein the reluctance motor has a stator 2, a rotor 3, and a flux barrier structure 4, a shaft 5, a winding layer 6, and at least one annular stepped groove 7. The detailed structure of each component, assembly relationships, and principle of operation in the present invention will be described in detail hereinafter.

Refer to FIG. 1, the stator 2 has a stator core 21, a plurality of grooves 22, and a plurality of stator coils 23, wherein the grooves are formed alternately along a inner diameter of the stator core 21, and the stator coils 23 are wound on the projections between the grooves correspondingly. For example, a material of the stator core 21 is an iron or an alloy thereof, and a material of the stator coils 23 is a copper or an alloy thereof.

Refer to FIGS. 1 and 2, the rotor 3 is made by 3D printing, and rotated with respect to the stator core 21 of the stator 2. As shown in FIG. 2, the rotor 3 is a cylinder, and the shaft 5 passes through a center of the rotor 3. The winding layer 6 is formed on an outer peripheral edge of the rotor 3, and the rotor 3, the shaft 5, and the winding layer 6 are integrally combined and synchronously rotated with respect to the stator 2.

Figure 3:
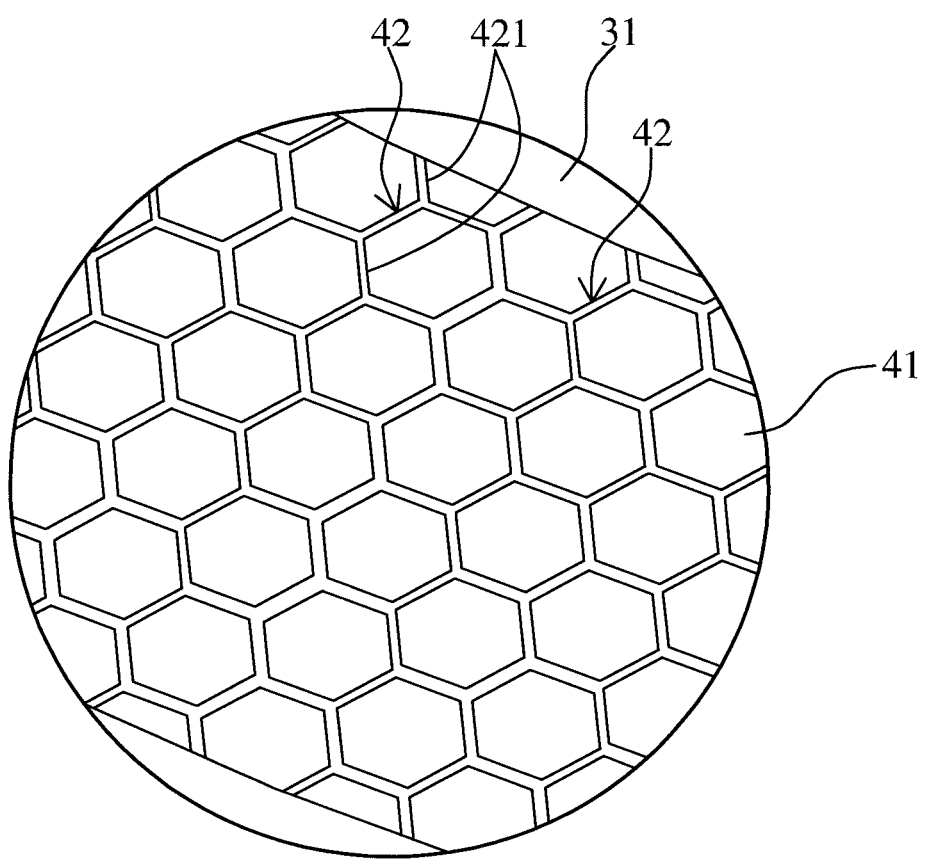
FIG. 3 is a view of a flux barrier structure of the reluctance motor according to a preferred embodiment of the present invention.

Refer to FIGS. 2 and 3, the flux barrier structure 4 is disposed in the rotor 3, and the flux barrier structure 4 has at least one flux barrier space 41 and a plurality of supporting bars 42, wherein the flux barrier space 41 is defined by a flux barrier surrounding wall 31, and the flux barrier space axially passes through the rotor 3 from a top surface 32 of the rotor 3 to a bottom surface 33 thereof. In the embodiment in FIG. 2, a plurality of flux barrier spaces 41 are formed in the rotor 3, each of the flux barrier spaces 41 is formed an arc shape on the top surface 32, and the flux barrier spaces 41 are disposed in four directions respectively, wherein a angel between the two adjacent direction is 90 degrees, and the flux barrier spaces 41 are arranged equally spaced in the rotor 3. Furthermore, the supporting bars 42 are intersected with each other within the flux barrier space 41, and each of the supporting bars 42 is extended from one side of the flux barrier surrounding wall 31 to an opposite side of the flux barrier surrounding wall 31. In the embodiment, when the rotor 3 is made by 3D printing, the flux barrier spaces 41 and the supporting bars 42 are formed simultaneously. The rotor 3 and the supporting bars 42 are made of the same material for 3D printing, for example the material may include magnetic conductive particles and thermoplastic polymer, or only magnetic conductive particles can be implemented. The magnetic conductive particles are iron powder or iron alloy powder, and the particle size of the powder is 800 mm to 3 μm. The thermoplastic polymer is acrylonitrile butadiene styrene. The weight of the magnetic conductive particles is 10 weight percent to 90 weight percent with respect to the thermoplastic polymer. The 3D printing technology is adopted fused deposition modeling (FDM) or selective Laser Sintering (SLS). The saturation magnetization of the rotor 3 is controlled to be between 25 emu/g and 275 emu/g.

Figure 4:
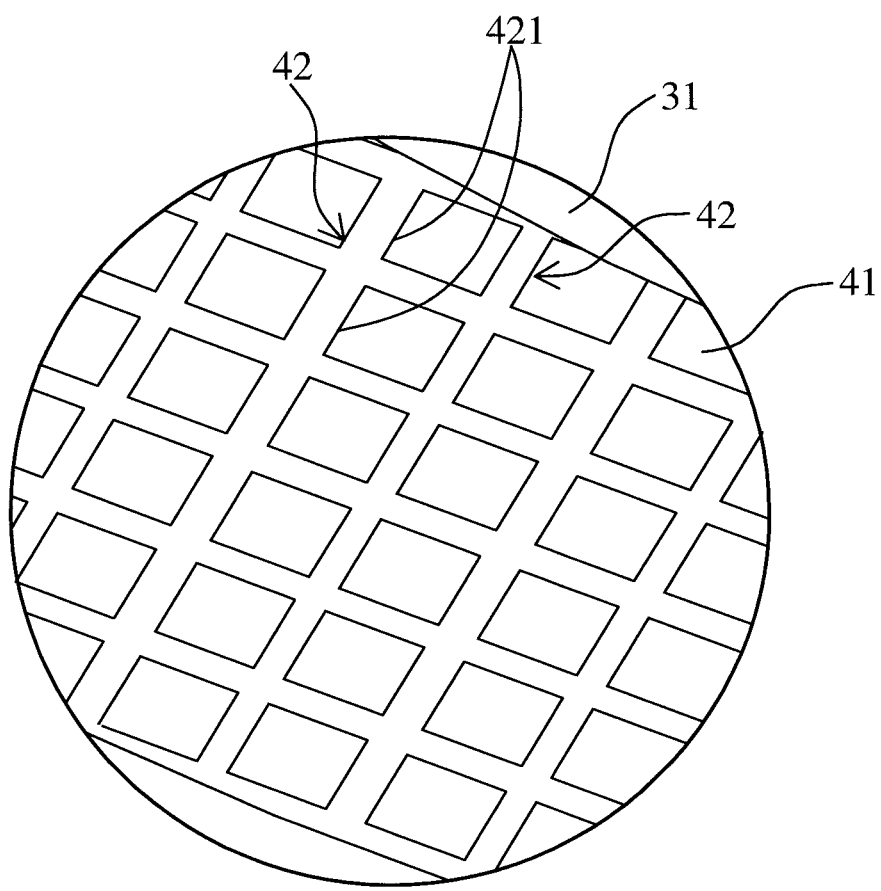
FIG. 4 is a view of another type of the flux barrier structure of the reluctance motor according to a preferred embodiment of the present invention.

Refer to FIGS. 2 and 3, each of the supporting bars 42 specifically has a plurality of extensions 421, and the extensions 421 are intertwined. A cross-sectional width of each of the supporting bars 42 is ranged from 1 mm to 2 mm, and a spacing distance between each two of the supporting bars 42 adjacent to each other is ranged from 1 mm to 1.5 mm. In the embodiment, the supporting bars 42 are arranged to be a honeycomb construction, and the extensions 421 are extended in an identical direction as shown in FIG. 3. In other embodiment, the supporting bars 42 are also arranged to be a meshy construction, and the extensions 421 are extended in different directions as shown in FIG. 4.

Figure 5:
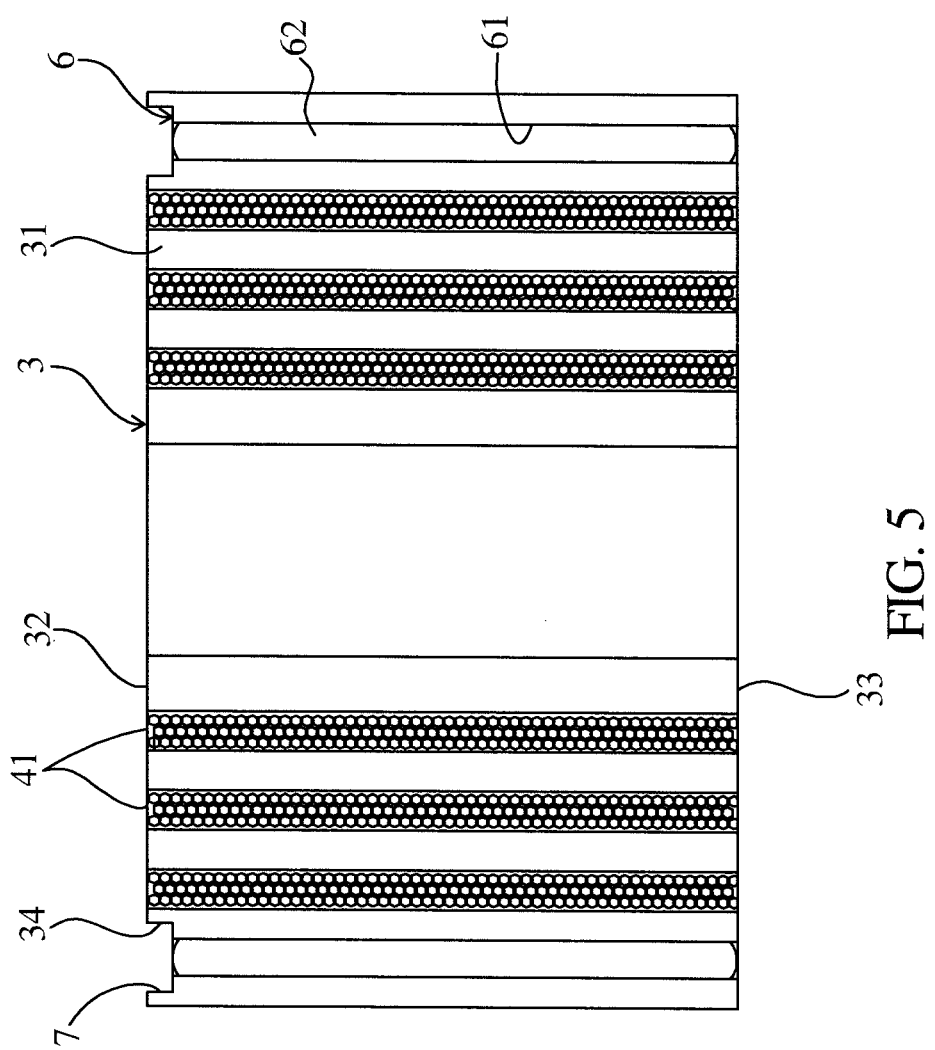
FIG. 5 is a sectional view of the rotor of the reluctance motor according to a preferred embodiment of the present invention.

Refer to FIGS. 2 and 5, the winding layer 6 is disposed on an outer peripheral surface 34 of the rotor 3, and the winding layer 34 includes a plurality of through holes 61 and a plurality of conductor strips 62 inserted in the through holes 61 respectively, each of the through holes 61 is cylindrical. The winding layer 6 is made of a non-metallic and conductive metal material (such as copper or aluminum). The conductor strips 62 are made of a magnetic conductive metal material (such as copper or alloy thereof), and inserted in the through holes 61 respectively.

Refer to FIGS. 2 and 5, the annular stepped groove 7 is formed on an end surface of the surrounding layer 6, which is a recessed portion disposed surround the top surface 32 of the rotor 3, and the annular stepped groove 7 is communicated with the through holes 61. In another embodiment, two annular stepped grooves 7 are formed on two opposed end surfaces respectively, wherein annular stepped grooves 7 is disposed surrounding the top surface 32 of the rotor 3, and the other is disposed surround the bottom surface 33 of the rotor 3.

According to a structure of the present invention, the supporting bars 42 are disposed within each of the flux barrier spaces 41, each of the supporting bars 42 is extended from one side of the flux barrier surrounding wall 31 to an opposite side of the flux barrier surrounding wall 31, and the extensions 421 are intertwined. Thus a strong support structure can be provided to support the flux barrier spaces 41, more flux barrier spaces 41 can be disposed in the flux barrier space 41, and the flux barrier space 41 can form a greater reluctance space. A structural strength of the rotor 3 can be improved to avoid from reducing a torque of the rotor 3 while increasing the number and the space of the flux barrier spaces 41, so that the rotor 3 can avoid from deforming when the rotor 3 is rotated at a high speed. In addition, a cross-sectional area of each of the supporting bars 42 is small and the reluctance is large, thus the magnetic flux leakage, and low rotating speed can be avoided.

As described above, the supporting bars 42 disposed within each of the flux barrier spaces 41 can avoid from reducing a torque of the rotor 3 while increasing the number and the space of the flux barrier spaces 41. In addition, improving a structural strength of the rotor 3 can avoid from deforming when the rotor 3 is rotated at a high speed.

The present invention has been described with preferred embodiments thereof and it is understood that many changes and modifications to the described embodiments can be carried out without departing from the scope and the spirit of the invention that is intended to be limited only by the appended claims.

What is claimed is:

1. A flux barrier structure, disposed in a rotor, and comprising:
   at least one flux barrier space defined by at least one flux barrier surrounding wall; and
   a plurality of supporting bars intersected with each other within the flux barrier space, and extended from one side of the flux barrier surrounding wall to an opposite side of the flux barrier surrounding wall.

2. The flux barrier structure according to claim 1, wherein the flux barrier space axially passes through the rotor from a top surface of the rotor to a bottom surface thereof.

3. The flux barrier structure according to claim 1, wherein the supporting bars are arranged to be a meshy construction or a honeycomb construction.

4. The flux barrier structure according to claim 1, wherein each of the supporting bars has a plurality of extensions, and the extensions are extended in an identical direction or in different directions.

5. The flux barrier structure according to claim 1, wherein a cross-sectional width of each of the supporting bars is ranged from 1 mm to 2 mm.

6. The flux barrier structure according to claim 1, wherein a spacing distance between each two of the supporting bars adjacent to each other is ranged from 1 mm to 1.5 mm.

7. The flux barrier structure according to claim 1, wherein the flux barrier structure comprises a plurality of the flux barrier spaces which are equidistantly disposed and spaced from each other within the rotor.

8. A reluctance motor, comprising:
a stator;
a rotor rotated with respect to the stator; and
a flux barrier structure disposed in the rotor, and comprising:
at least one flux barrier space defined by at least one flux barrier surrounding wall; and
a plurality of supporting bars intersected with each other within the flux barrier space, and extended from a side of the flux barrier surrounding wall to an opposite side of the flux barrier surrounding wall.

9. The reluctance motor according to claim 8, wherein the reluctance motor further comprises a winding layer disposed on an outer peripheral surface, wherein the winding layer includes a plurality of through holes and a plurality of conductor strips inserted in the through holes respectively.

10. The reluctance motor according to claim 9, wherein the reluctance motor further comprises an annular stepped groove formed on an end surface of the surrounding layer, and the annular stepped groove is communicated with the through holes.

* * * * *